United States Patent [19]
Lieuwen

[11] Patent Number: 5,809,113
[45] Date of Patent: Sep. 15, 1998

[54] ENHANCED, DEFERRED MESSAGING SERVICE

[75] Inventor: Daniel Francis Lieuwen, New Providence, N.J.

[73] Assignee: AT&T Corp, Middletown, N.J.

[21] Appl. No.: 679,045

[22] Filed: Jul. 12, 1996

[51] Int. Cl.⁶ .................................................. H04M 1/64
[52] U.S. Cl. ............................ 379/69; 379/67; 379/92.03
[58] Field of Search ................................ 379/67, 88, 89, 379/92.01, 92.02, 92.03, 69, 77, 79, 80, 81, 82

[56] References Cited

U.S. PATENT DOCUMENTS

| | | |
|---|---|---|
| 4,065,642 | 12/1977 | McClure . |
| 4,941,168 | 7/1990 | Kelly, Jr. ................................. 379/69 |
| 5,329,578 | 7/1994 | Brennan et al. . |
| 5,371,787 | 12/1994 | Hamilton ................................ 379/69 |
| 5,644,624 | 7/1997 | Caldwell ................................ 379/67 |

OTHER PUBLICATIONS

AT&T Pocket Leaflet/Wallet Card, "#1 2 3", #ANI–6–005.

*Primary Examiner*—Fan S. Tsang
*Attorney, Agent, or Firm*—Alfred G. Steinmetz

[57] ABSTRACT

An enhanced, deferred messaging service ensures a message is received even when an answering machine is connected to a line and receives the call. In such a case, the service notes the number of rings n necessary to activate the recipient's answering machine. The service then resumes redialing and lets the phone ring n–1 times for each attempted call until either the phone is answered or a time-out occurs. If the recipient's answering machine, however, is in toll-saver mode, then the answering machine may answer a second time in less than n–1 rings. If the toll-saver feature is activated, then the service notes the number of rings m which caused the answering machine to be reached in toll-saver mode. The service then resumes redialing and lets the phone ring m–1 times for each attempted call until either the phone is picked up or a time-out occurs. Thus, even after leaving a message on an answering machine, the service will attempt to reach a human.

16 Claims, 4 Drawing Sheets

ENHANCED, DEFERRED MESSAGING SERVICE

BACKGROUND

The present invention relates to communication services. More specifically, this invention relates to an enhanced, deferred telephone messaging service.

Without the aid of a messaging service, a caller upon encountering a busy signal or repeated unanswered telephone rings would have to repeatedly redial a desired number, often for several hours, until the busy phone line became available or the unattended phone line was answered. Existing messaging services automate this redialing procedure and deliver a pre-specified message, recorded by the caller, when the desired phone line becomes available. Messaging services thereby obviate the need for a caller to remain near a phone and liberate the caller to pursue other tasks, such as boarding an airline flight without phone services. One such existing messaging service is the #123 service currently offered by AT&T. The #123 service redials the desired phone number every thirty minutes until either the phone is answered or a predetermined period of time expires, for example six hours. Each attempted call is terminated when either the phone is answered and the pre-specified message can be replayed, or when a specific period of time has expired or a specific number of rings has occurred. The prespecified message is replayed only when the phone is answered for the first time. After this first message delivery, the existing messaging services cease any further attempts to again deliver the message.

With existing messaging services, the message is replayed regardless of whether the call is answered by a human or by an answering machine, although the manner of delivery differs for each case. If the phone is answered by a human, the message is played back immediately; if the phone is answered by an answering machine, the message is played back after the prerecorded greetings message and the conventional record tone of the answering machine are completed.

Differentiating whether a call is answered by an answering machine or by a person is generally known. For example, as discussed in U.S. Pat. No. 5,475,738 to Penzias et al., this determination can be made with the use of conventional speech recognition techniques. In particular, a predetermined "script" can be recognized in the prerecorded greetings message of the answering machine. The existing messaging services wait for the conventional record tone and then transmit the message to the answering machine which records the message.

Existing messaging services, however, have shortcomings. If a human does not answer the phone and an answering machine is connected when an existing messaging service attempts to delivery a message, the existing messaging service plays back the message to the answering machine which records the message. Because people typically check their answering machines only infrequently, a very important message that requires a response as soon as possible (e.g. no progress can be made on a project until the answer is received, getting in touch with someone about a dying mother) may remain unheard for long periods of time. Given the uncertainty of existing messaging services, repeated manual redialing is the only way to ensure that the message is heard as soon as possible by the desired recipient.

SUMMARY OF THE INVENTION

An object of the enhanced, deferred messaging service of the present invention is to improve upon existing messaging services, to dramatically reduce the time it takes for a message to be received and to eliminate the necessity of manual redialing as the only alternative to existing messaging services.

The enhanced, deferred messaging service of the present invention ensures a message is received by a human as soon as possible even when an answering machine is connected to the phone line. In such a case, the service of the present invention notes the number of rings n necessary to activate the recipient's answering machine. The service then resumes redialing and letting the phone ring n−1 times for each attempted call until either the phone is answered or a time-out occurs. If the recipient's answering machine, however, is in toll-saver mode, then the answering machine may answer a second time in less than n−1 rings. The toll-saver mode is a feature of many answering machines where the number of rings necessary to activate the answering machines is reduced, for example, from four rings to two rings, when messages have been recorded but are as yet unheard. If the toll-saver feature is activated, then the service notes the number of rings m which caused the answering machine to be reached in toll-saver mode. The service then resumes redialing and letting the phone ring m−1 times for each attempted call until either the phone is picked up or a time-out occurs. Thus, even after leaving a message on an answering machine, the service will attempt to reach a human.

To identify an answering machine, the message is played shortly after the phone is picked up (roughly one-half second to one second later). If the other party keeps talking while the message is being played for several seconds, then it is likely that there is an answering machine on the other end. If a conventional record tone is then detected on the line, it is safe to conclude that an answering machine has been detected. The first time an answering machine is detected, the service waits until the answering machine greeting is completed and then plays back the message from the beginning. Thus, the service ensures that the message is recorded by the answering machine once; the service then continues to redial the phone number to reach a human. Once the message has been recorded by the answering machine, no need exists to leave the same message again. Therefore, the next time that the service plays back the message, a human will receive the message. In the case where the desired recipient checks the answering machine before the service attempts to redial the phone, the desired recipient still receives the message as soon as possible.

DETAILED DESCRIPTION

Figure 1:
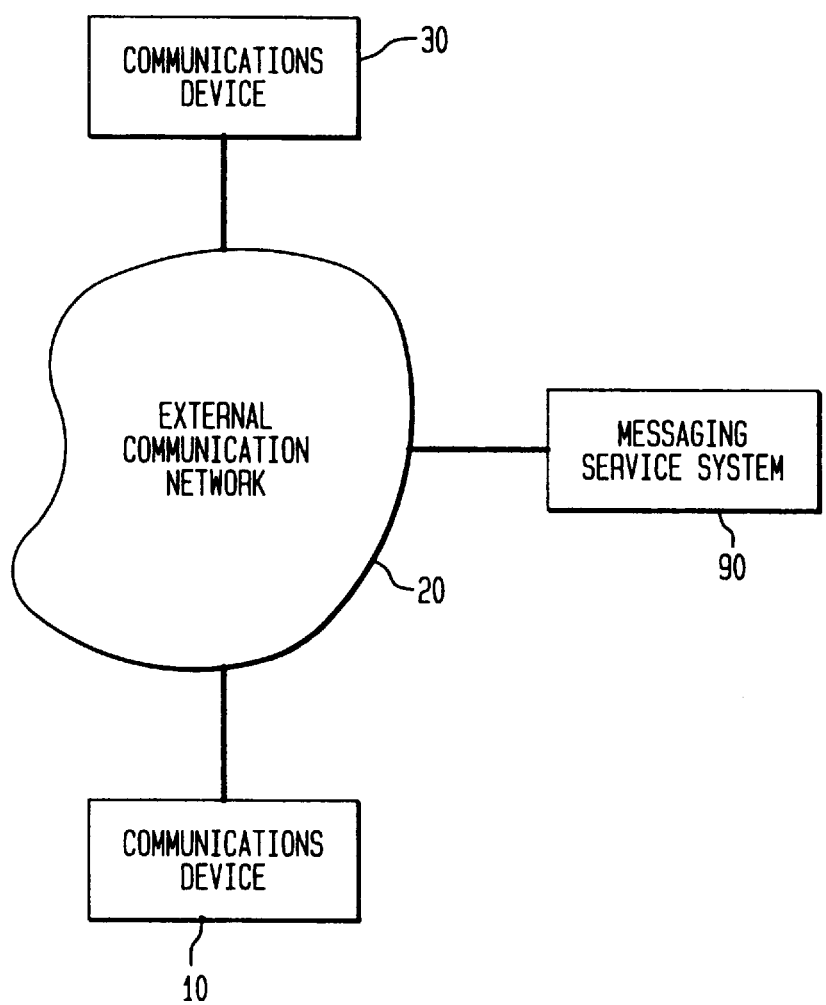
FIG. 1 shows a system block diagram of a system for providing an enhanced, deferred messaging service.

FIG. 1 illustrates a possible system configuration for the present invention. Communications device 10, which can be any of a variety of types, such as a telephone, personal computer, etc., is connected an external communication network 20 in well-known fashion. A caller can initiate a call, for example, by dialing a desired phone number whereby conventional DTMF "touch tone" audio signals are transmitted to communication network 20. Communication network 20 detects the DTMF signals and through various switches, computer processors and software connects the communication device 10 of the caller to the communication device 30 of the desired call recipient. Although FIG. 1 shows two communication devices 10 and 30, any number of communication devices can be connected to the communication network 20. For the purposes of the following discussion, the caller is located at communication device 10 and the desired call recipient is located at communication device 30.

Messaging service system 40 provides messaging services for the desired recipient at communications device 30. Communications device 10 is connected to messaging service system 40 via the external communication network 20. The external communication network 20 may comprise private networks, public networks or both. Communication devices 10 and 30 can be connected to the external communication network 20 through a private branch exchange (PBX), a local exchange carrier (LEC), etc. Messaging service system 40 includes the voice storage devices, processor and software necessary to perform the messaging service of the present invention.

The messaging service can be configured in a variety of ways to provide the caller and the desired recipient several ways of accessing the messaging service. The caller seeking to leave a message from communication device 10 could call messaging service system 40 directly, e.g., by a 1-800 phone number, through external communication network 20. The caller would enter into messaging service system 40 the desired phone number or numbers to where the message should be delivered, leave the message and then terminate the call. Messaging service system 40 would then deliver the message to the recipient's communication device 30, as disclosed below in connection with FIG. 2.

Alternatively, the caller could directly call the desired recipient from communication device 10 using a credit card or a calling card through a credit card/calling card server within external communication network 20. Where the call is not answered, the credit card/calling card server could then ask the caller if it would like to use the service of the present invention. If the caller disconnects the call without indicating whether it wishes to utilize the service of the present invention, the credit card/calling card server could immediately call the caller at communication device 10 and again inquire as to whether the caller wishes to utilize the service of the present invention. This inquiry could also give the caller options for other services, such as the existing #123 messaging service. The caller from communication device 10 would enter the desired phone number or numbers to where the message should be delivered, leave the message and then terminate the call. The messaging service system 40 would then deliver the message to the recipient's communication device 30 as disclosed below in connection with FIG. 2.

As another alternative, the caller from communication device 10 could directly call the desired recipient at communication device 30 through external communication network 20. Where the call is not answered, communication network 20 could then switch the call to an in-network answering service that is part of messaging service system 40. The caller can then leave a message and terminate the call. Messaging service system 40 would then either deliver the message to recipient at communication device 30 as disclosed below or retain the message in messaging service system 30, acting as an in-network answering machine. The decision whether to deliver the message via the present invention or to leave the message in the messaging service system 40, acting as an in-network answering machine, could be based on priority schemes predetermined by the caller and the in-network answering machine subscriber, as generally known in the art. For example, in EP 588,101 to Goldman et al., the service subscriber can designate specific calling phone numbers whose messages will receive prioritized processing when appropriate, and the caller can designate calls it desires to be prioritized as urgent.

Figure 2A:
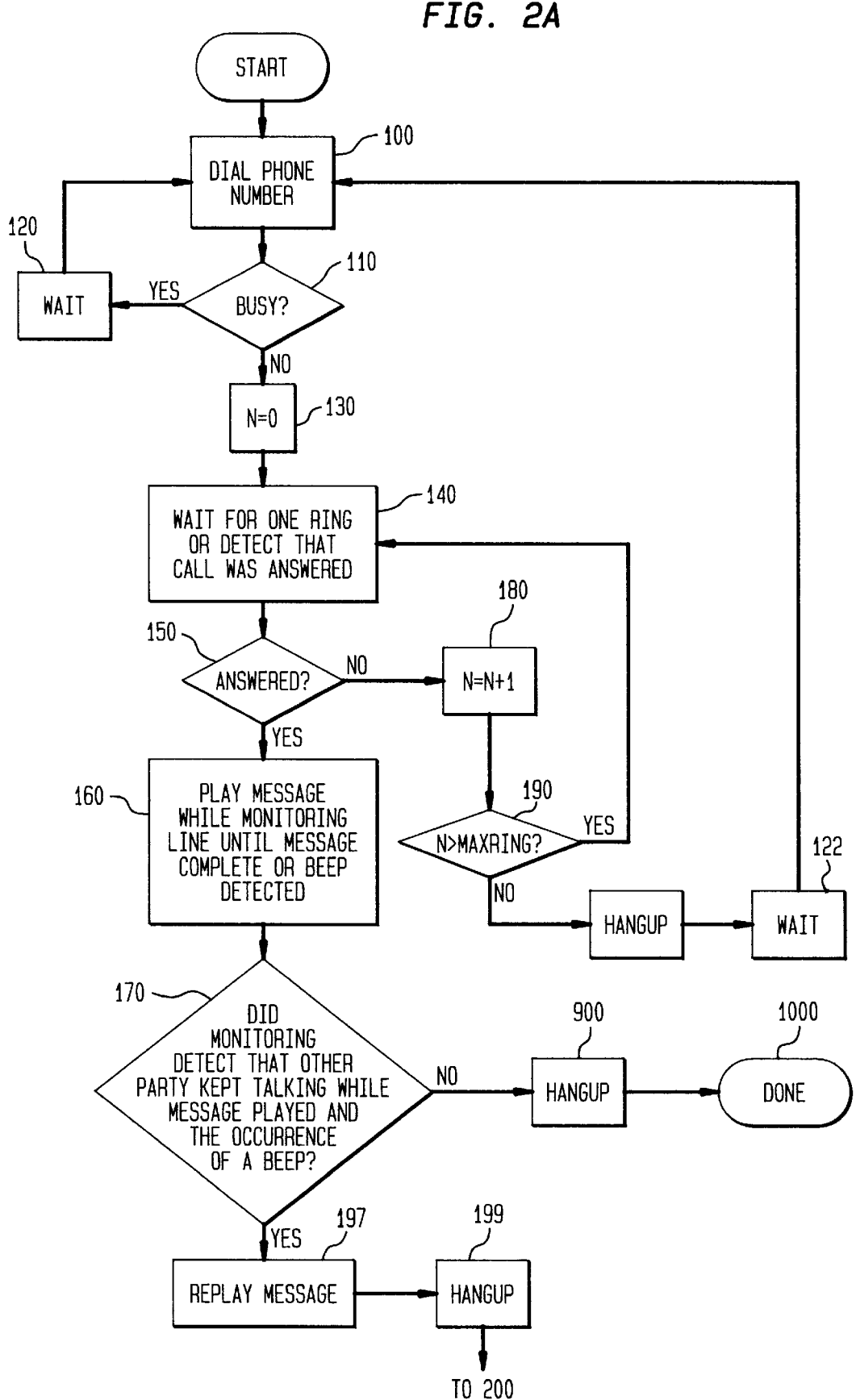
FIGS. 2(a)–(c) show a flowchart of an exemplary process for providing an enhanced, deferred messaging service.
Figure 2B:
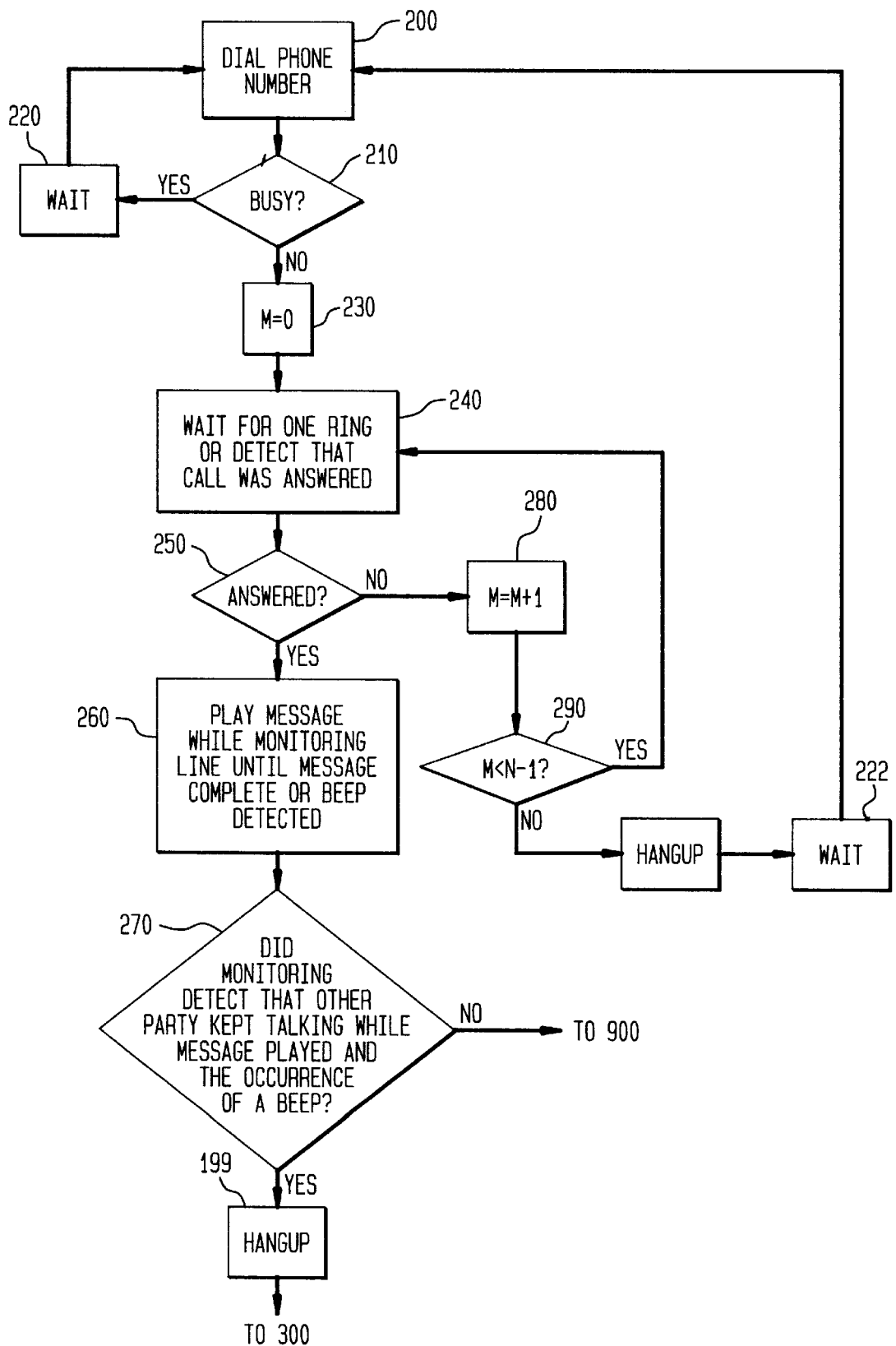
Figure 2C:
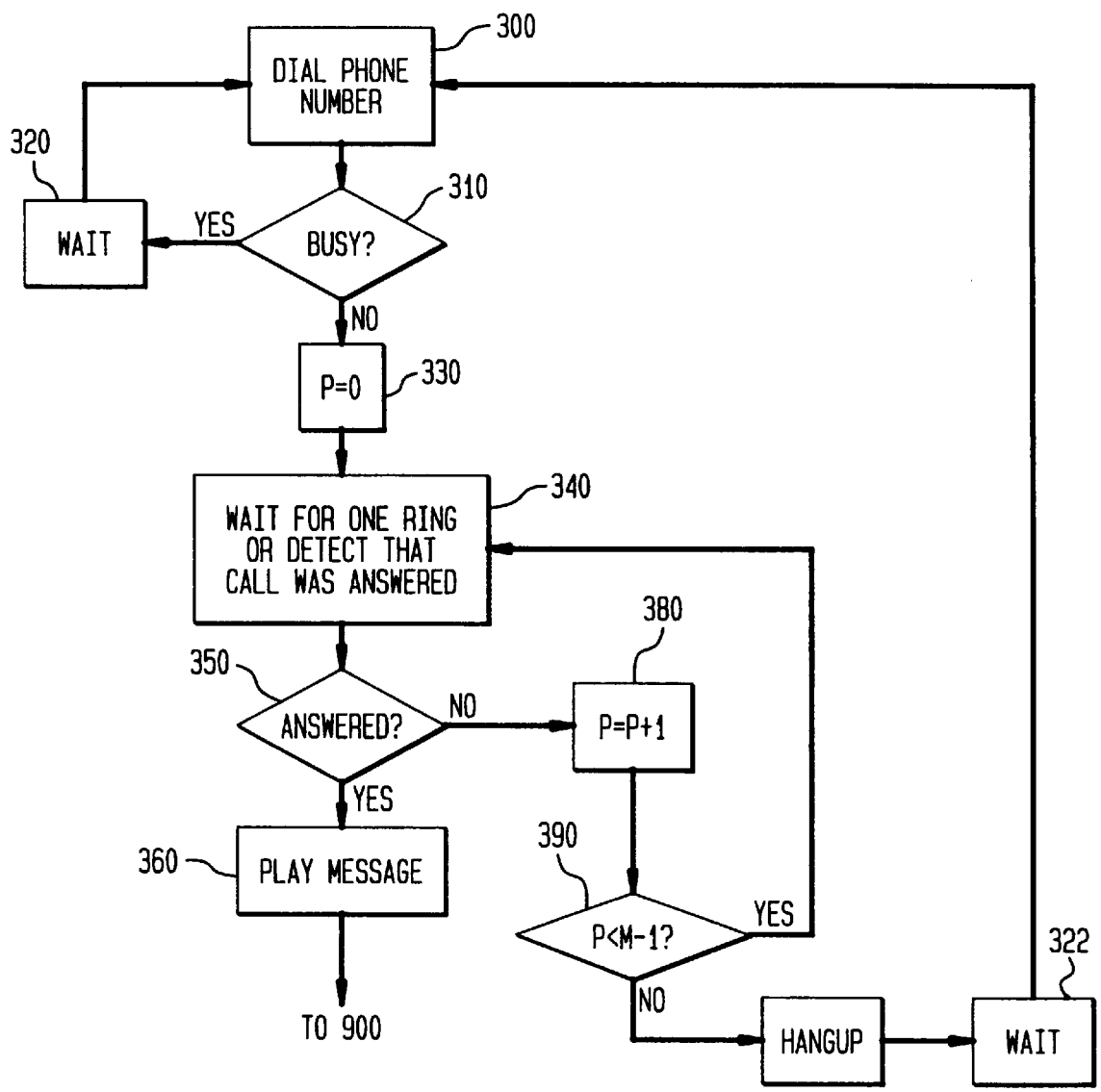

FIG. 2 is a flowchart of an exemplary process for providing an enhanced, deferred messaging service in accordance with the principles of the invention. The process begins at step 100 in which the service dials the desired phone line. Conditional branch point 110 tests whether the phone line dialed is busy. If the phone line is busy, the process proceeds to step 120 in which the service waits for a specified period of time. Then, control passes to step 100 and the phone line is redialed. If the phone line is not busy, then a value n of a first register is set to zero in step 130 and the process proceeds to step 140. At step 140, the service waits for one ring or detects that the call was answered.

Next, conditional branch point 150 tests whether in fact the phone line was answered. If the phone was answered, then control passes to step 160. If the phone line was not answered, then the process proceeds to step 180 in which the value n of the first register is incremented by one. At step 190, n is compared to a predetermined value maxring, the number of rings the service will attempt before aborting its current attempt to connect the phone line. The value maxring represents the maximum number of rings beyond which it is unlikely that the phone will be answered. For example, a person will not likely answer the phone after allowing it to ring more than ten times. If n is less than maxring, then control passes back to step 140. If n is not less than maxring, then the service terminates the call, waits a predetermined period of time and restarts the entire process at step 100.

At step 160, the case where the phone line was answered, the message is played while the phone line is monitored until the message playback is complete or a machine-beep is detected. Conditional branch point 170 tests whether an activated answering machine is connected at the answering party's side. An answering machine is connected when the detection system detects a voice at the answering party's side of the phone line continuing to talk through the service's message playback or detects a machine-like beep. If an activated answering machine was not detected, then the process proceeds to step 900, in which the call is terminated, and then proceeds to step 1000, where the process is completed. If an activated answering machine was detected, then the process proceeds to step 197 in which the message is restarted to the beginning and replayed. The message is replayed to ensure that the answering party's answering machine has recorded the message in case the desired recipient checks the answering machine before the service calls again. The process proceeds to step 199 in which the call is terminated. The process then continues to step 200.

At step 200, the desired phone line is again called. Conditional branch 210 tests whether the phone line is busy. A busy phone line indicates that the answering party's answering machine is still active and the service must wait before resuming. Thus, if the phone line is busy, the process proceeds to step 220 in which the service waits a predetermined time period and then returns to step 200. If the phone line is not busy, then the process proceeds to step 230 in which the value m of a second register is initialized to zero. The process then continues to step 240. At step 240, the service waits for one ring or detects that the call was answered.

Next, conditional branch point 250 tests whether in fact the phone line was answered. If the phone line was answered, then control passes to step 260. If the phone line was not answered, then the process proceeds to step 280 in which the value m of the second register is incremented by one. At step 290, m is compared to n−1. The value m represents the number of rings required before the answering party's answering machine becomes activated when the answering machine is in toll-saver mode. If the value m is less than n−1, then control passes back to step 240. If the value m, is not less than n−1, then the service terminates the call, waits a predetermined period of time and restarts the entire process at step 200.

At step 260, the case where the phone line was answered, the message is played while the line is monitored until the message playback is complete or a machine-beep is detected. Conditional branch point 270 tests whether an answering machine has been activated at the answering party's side. An answering machine is connected when the detection system detects a voice at the answering party's side on the phone line continuing to talk through the service's message playback or detects a machine-like beep. If an activated answering machine was not detected, then the process proceeds to step 900, in which the call is terminated, and then proceeds to step 1000, where the process is completed. If an activated answering machine was detected, then the process proceeds to step 199 in which the call is terminated. The process then continues to step 300.

At step 300, the desired phone number is again called. Conditional branch 310 tests whether the phone line is busy. A busy phone line indicates that the answering party's answering machine is still active and the service must wait before resuming. Thus, if the phone line is busy, the process proceeds to step 320 in which the service waits a predetermined time period and then returns to step 300. If the phone line is not busy, then the process proceeds to step 330 in which the value p of a third register is initialized to zero. The process then continues to step 340. At step 340, the service waits for one ring or detects that the call was answered.

Next, conditional branch point 350 tests whether in fact the phone was answered. If the phone was answered, then control passes to step 360. If the phone was not answered, then the process proceeds to step 380 in which the value p, is incremented by one. At step 390, the value p is compared to m−1. The value p represents the number of rings required before the answering party's answering machine becomes activated when the answering machine is in toll-saver mode. If p is less than m−1, then control passes back to step 340. If p is not less than m−1, then the service terminates the call, waits a predetermined period of time and restarts the entire process at step 300.

At step 360, the case where the phone was answered, the message is played to the recipient who, at this late point in the process, must be on the line. After the message is played, the process then proceeds to step 900 in which the call is terminated and then proceeds to step 1000 where the process is completed.

The present invention improves upon existing messaging services to dramatically reduce the time it takes for a message to be received by a human and to eliminate the necessity of manual redialing as the only alternative to existing messaging services. The present invention ensures a message is received by a human as soon as possible even when an answering machine is connected to the phone line.

It should, of course, be understood that while the present invention has been described in reference to particular applications and configurations, other arrangements should be apparent to those of ordinary skill in the art. For example, the messaging service of the present invention can be offered in conjunction with other communication services, such as #123. It could also be used to enhance in-network answering machines, by allowing them to be active rather than passive for important calls (where important is determined by caller hints, caller directives or both of the preceding). These implementations would merely require modifications to the external communication network 20 and the software of messaging service system 40.

What is claimed is:

1. A method used by a messaging service system for delivering a recorded message to a person at a specified communication device, which is serviced by a specified answering machine, within a communication system, comprising the steps of:
    (a) repeatedly dialing a phone line for less than a predetermined number of rings, maxring, until answered;
    (b) when the phone line is answered, detecting whether the phone line is answered by the person or the answering machine;
    (c) when the phone line is answered by the answering machine:
        (I) determining a number of rings, n, necessary to activate the answering machine;
        (ii) leaving the message on the answering machine; and
        (iii) repeatedly dialing the phone line for less than n rings until answered by the person; and
    (d) when the phone line is answered by the person, delivering the message.

2. The method of claim 1, further comprising the step of:
    (e) when the phone line is answered by the answering machine in toll-saver mode:
        (i) determining a number of rings, m, necessary to activate the answering machine in toll-saver mode; and
        (ii) repeatedly dialing the phone line for less than m rings until answered by the person; and
    wherein said step (c)(iii) includes repeatedly dialing the phone line for less than n rings until answered by the answering machine in toll-saver mode.

3. The method of claim 1, wherein a caller connects to said messaging service system by direct dialing.

4. The method of claim 1, wherein a caller connects to said messaging service system upon failing to connect with the phone line through a credit card or calling card server.

5. The method of claim 1, wherein a caller connects through a switch to said messaging service system upon failing to connect with the phone line.

6. The method of claim 1, wherein said step (b) includes the following sub-steps:
    (i) playing the message once the phone line is answered;
    (ii) detecting whether talking from the called party continues during sub-step (i); and
    (iii) concluding an answering machine is activated when talking is detected in sub-step (ii).

7. A method used by a messaging service system for delivering a recorded message to a person at a specified communication device to which an answering machine may be connected, within a communication system, comprising the steps of:
    (a) repeatedly dialing a phone line for less than a predetermined number of rings, maxring, until answered;
    (b) when the phone line is answered, detecting whether the phone line is answered by the person or the answering machine;

(c) when the phone line is answered by the answering machine:
  (i) determining a number of rings, n, necessary to activate the answering machine;
  (ii) leaving the message on the answering machine; and
  (iii) repeatedly dialing the phone line for less than n rings until answered by the person or the answering machine in toll-saver mode;
(d) when the phone line is answered by the answering machine in toll-saver mode:
  (i) determining a number of rings, m, necessary to activate the answering machine in toll-saver mode; and
  (ii) repeatedly dialing the phone line for less than m rings until answered by the person; and
(e) when the phone line is answered by the person, delivering the message.

8. The method of claim 7, wherein a caller connects to said messaging service system by direct dialing.

9. The method of claim 7, wherein a caller connects to said messaging service system upon failing to connect with the phone line through a credit card or calling card server.

10. The method of claim 7, wherein a caller connects through a switch to said messaging service system upon failing to connect with the phone line.

11. The method of claim 7, wherein said step (b) includes the following sub-steps:
  (i) playing the message once the phone line is answered;
  (ii) detecting whether talking from the called party continues during sub-step (i); and
  (iii) concluding an answering machine is activated when talking is detected in sub-step (ii).

12. A messaging service system for delivering a recorded message to a person at a specified phone line to which an answering machine may be connected, within a communication system, comprising:

a ring detector, said ring detector determines a number of rings, n, necessary to activate the answering machine when connected and when the person does not answer;

a dialing device, said dialing device, until the phone line is answered, repeatedly dials the phone line for less than a predetermined number of rings, maxring, when an answering machine has not been detected by said detector, and less than n rings when the answering machine has been detected by said detector; and a message playback device, said message playback device delivers the message after said detector first detects the answering machine and after said detector detects the person answering the phone line.

13. The messaging service system of claim 12, wherein:

said ring detector determines a number of rings, m, necessary to activate the answering machine in toll-saver mode when connected and when the person does not answer; and said dialing device, until the phone line is answered, repeatedly dials the phone line for less than m rings when the answering machine in toll-saver mode has been detected by said detector.

14. The messaging service system of claim 12, wherein a caller connects to said messaging service system by direct dialing.

15. The messaging service system of claim 12, wherein a caller connects to said messaging service system upon failing to connect with the specified phone line through a credit card or calling card server.

16. The messaging service system of claim 12, wherein a caller connects through a switch to said messaging service system upon failing to connect with the specified phone line.

* * * * *